United States Patent
Baumgart

(10) Patent No.: US 8,693,755 B2
(45) Date of Patent: Apr. 8, 2014

(54) SYSTEM FOR ADJUSTMENT OF IMAGE DATA ACQUIRED USING A CONTRAST AGENT TO ENHANCE VESSEL VISUALIZATION FOR ANGIOGRAPHY

(75) Inventor: John Baumgart, Hoffman Estates, IL (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 604 days.

(21) Appl. No.: 13/076,674

(22) Filed: Mar. 31, 2011

(65) Prior Publication Data

US 2011/0311113 A1    Dec. 22, 2011

Related U.S. Application Data

(60) Provisional application No. 61/355,632, filed on Jun. 17, 2010.

(51) Int. Cl.
   *G06K 9/00* (2006.01)

(52) U.S. Cl.
   USPC ........... 382/130; 382/100; 382/128; 382/131; 600/407; 600/411; 600/424

(58) Field of Classification Search
   None
   See application file for complete search history.

(56) References Cited

U.S. PATENT DOCUMENTS

| | | | | |
|---|---|---|---|---|
| 4,878,115 | A * | 10/1989 | Elion | 378/98.5 |
| 5,345,938 | A * | 9/1994 | Nishiki et al. | 600/463 |
| 2005/0054913 | A1* | 3/2005 | Duerk et al. | 600/423 |
| 2005/0080327 | A1* | 4/2005 | Jenkins et al. | 600/407 |
| 2007/0189457 | A1* | 8/2007 | Deinzer | 378/98.12 |
| 2008/0027316 | A1* | 1/2008 | Baumgart | 600/425 |
| 2009/0180591 | A1* | 7/2009 | Baumgart | 378/98.12 |
| 2009/0192385 | A1* | 7/2009 | Meissner et al. | 600/426 |
| 2010/0145193 | A1* | 6/2010 | Florent et al. | 600/427 |
| 2010/0172556 | A1 | 7/2010 | Cohen et al. | |
| 2010/0228076 | A1 | 9/2010 | Blank et al. | |
| 2010/0290693 | A1 | 11/2010 | Cohen et al. | |
| 2011/0235890 | A1* | 9/2011 | Ruijters | 382/132 |

OTHER PUBLICATIONS

Tunski et al., Digital Subtraction Angiography "Road Map", Dec. 1982, AJR 139:1233-1234.*

* cited by examiner

*Primary Examiner* — Matthew Bella
*Assistant Examiner* — Jason Heidemann
(74) *Attorney, Agent, or Firm* — Brennan K Bradley

(57) ABSTRACT

A system provides a roadmap image displaying a vessel structure using an imaging system to acquire data representing multiple temporally sequential individual images of vessels of a region of interest of patient anatomy in the presence of a contrast agent. An image data processor generates multiple sequential cumulative images corresponding to the individual images and an individual current cumulative image corresponds to a current image of the individual images. The current cumulative image comprises cumulative pixel luminance values and an individual cumulative pixel luminance value is generated from luminance values of pixels, spatially corresponding to the individual cumulative pixel and present in images comprising a subset of the individual images. The subset comprises contiguous images of the temporally sequential individual images acquired preceding the current image and including the current image. An output processor provides the multiple sequential cumulative images to a destination.

15 Claims, 6 Drawing Sheets

SYSTEM FOR ADJUSTMENT OF IMAGE DATA ACQUIRED USING A CONTRAST AGENT TO ENHANCE VESSEL VISUALIZATION FOR ANGIOGRAPHY

This is a non-provisional application of provisional application Ser. No. 61/355,632 filed Jun. 17, 2010, by J. Baumgart.

FIELD OF THE INVENTION

This invention concerns a system for providing a roadmap image displaying a vessel structure of a region of interest of a patient for use in guiding an invasive instrument during an angiography procedure.

BACKGROUND OF THE INVENTION

Angiographic roadmapping is a procedure by which a contrast agent injection is made under live fluoroscopy X-ray imaging and resulting acquired images are saved for use as a roadmap of a vessel during an interventional angiography procedure. In some cases, it is possible that the contrast agent injection results in a roadmap that contains more contrast agent and shows more vasculature than would be optimal for the rest of a roadmapping procedure. This prevents use of the roadmap for representing a complete area of interest for potential further intervention in procedures such as embolizations. A system according to invention principles addresses these deficiencies and related problems.

SUMMARY OF THE INVENTION

A system adjusts the scope of a contrast injection that is used during an angiographic roadmapping imaging procedure to enhance visualization of vasculature of interest and exclude unwanted information. A system provides a roadmap image displaying a vessel structure of a region of interest of a patient for use in guiding an invasive instrument during an angiography procedure. An imaging system acquires data representing multiple temporally sequential individual images of vessels of a region of interest of patient anatomy in the presence of a contrast agent following introduction of contrast agent into the patient. An image data processor generates multiple sequential cumulative images corresponding to the multiple temporally sequential individual images and an individual current cumulative image corresponds to a current image of the multiple temporally sequential individual images. The current cumulative image comprises cumulative pixel luminance values and an individual cumulative pixel luminance value is generated from luminance values of pixels, spatially corresponding to the individual cumulative pixel and present in images comprising a subset of the temporally sequential individual images. The subset comprises contiguous images of the temporally sequential individual images acquired preceding the current image and including the current image. An output processor provides the multiple sequential cumulative images to a destination.

DETAILED DESCRIPTION OF THE INVENTION

Figure 1:
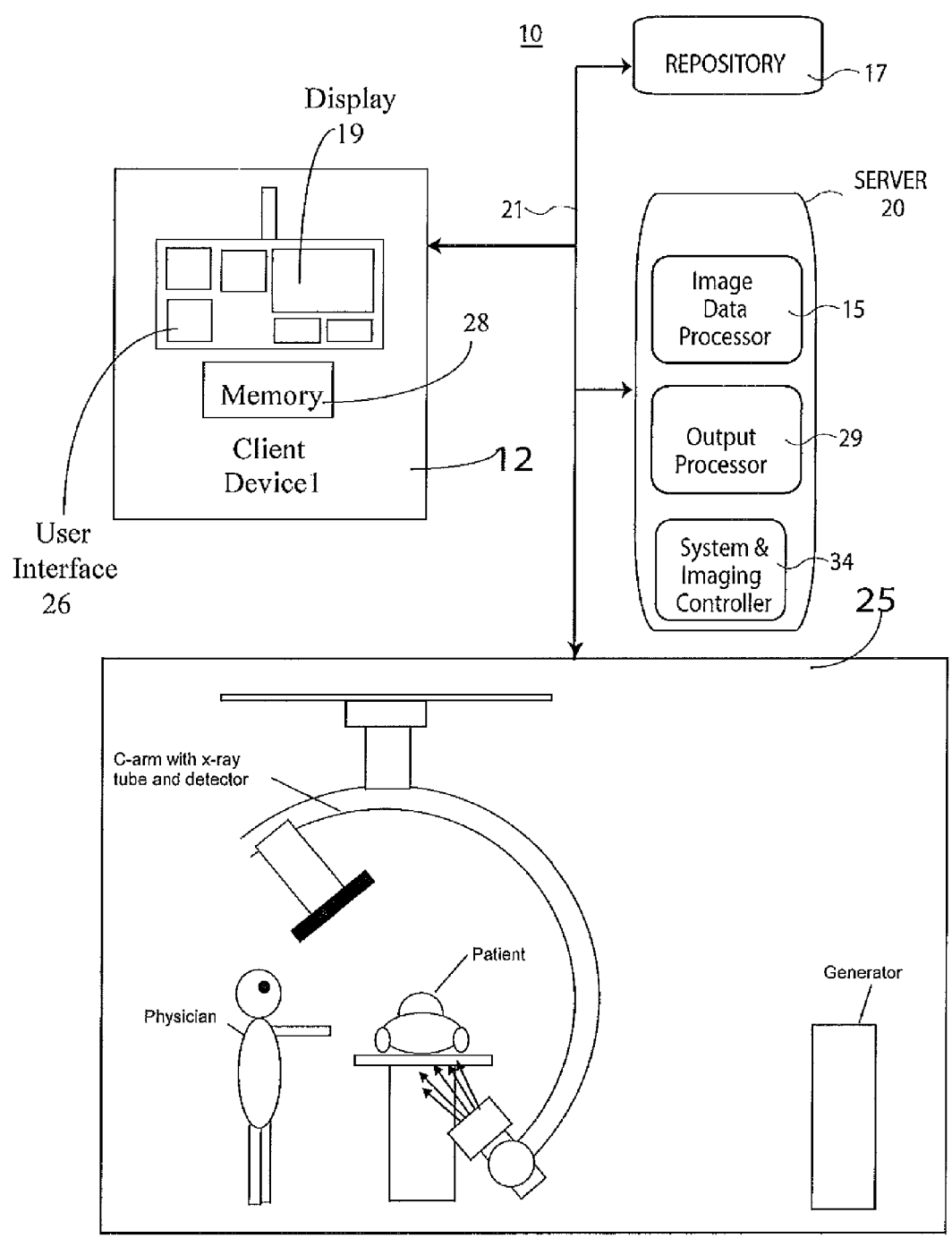
FIG. 1 shows a system for providing a roadmap image displaying a vessel structure of a region of interest of a patient for use in guiding an invasive instrument during an angiography procedure, according to invention principles.

As used herein, a roadmap image comprises a live X-ray (low dose) fluoroscopy image with particular vasculature and bones of a roadmap mask image subtracted to show particular features such as an invasive instrument or particular vessels with enhanced visualization for use during an interventional angiography procedure, for example. A roadmapping procedure is a procedure for providing a roadmap image. A system adjusts appearance of contrast agent in images for use in an angiographic roadmapping procedure to isolate vasculature of interest. FIG. 1 shows system 10 for providing a roadmap image displaying a vessel structure of a region of interest of a patient for use in guiding an invasive instrument during an angiography procedure. System 10 includes one or more processing devices (e.g., workstations or portable devices such as notebooks, Personal Digital Assistants, phones) 12 that individually include a user interface control device 26 such as a keyboard, mouse, touchscreen, voice data entry and interpretation device, display 19 and memory 28. System 10 also includes at least one repository 17, X-ray imaging modality system 25 (which in an alternative embodiment may comprise an MR (magnetic resonance) or CT scan device, for example) and server 20 intercommunicating via network 21. X-ray modality system 25 provides patient X-ray medical images using a C-arm X-ray radiation source and detector device rotating about a patient table and an associated electrical generator for providing electrical power for the X-ray radiation system. The medical images are generated in response to predetermined user (e.g., physician) specific preferences. At least one repository 17 stores medical image studies for multiple patients in DICOM compatible (or other) data format.

A medical image study individually includes multiple image series of a patient anatomical portion which in turn individually include multiple images. Server 20 includes image data processor 15, output processor 29 and system and imaging controller 34. Display 19 presents display images comprising a Graphical User Interface (GUI). Imaging controller 34 controls operation of imaging device 25 in response to user commands entered via user interface 26. In alternative arrangements, one or more of the units in server 20 may be located in device 12 or in another device connected to network 21.

Imaging system 25 acquires data representing multiple temporally sequential individual images of vessels of a region of interest of patient anatomy in the presence of a contrast agent following introduction of contrast agent into the patient. Image data processor 15 generates multiple sequential cumulative images corresponding to the multiple temporally sequential individual images and an individual current cumulative image corresponds to a current image of the multiple temporally sequential individual images. The current cumulative image comprises cumulative pixel luminance values and an individual cumulative pixel luminance value is generated from luminance values of pixels, spatially corresponding to the individual cumulative pixel and present in images comprising a subset of the temporally sequential individual images. The subset comprises contiguous images of the temporally sequential individual images acquired preceding the current image and including the current image. Output processor 29 provides the multiple sequential cumulative images to a destination.

Figure 2:
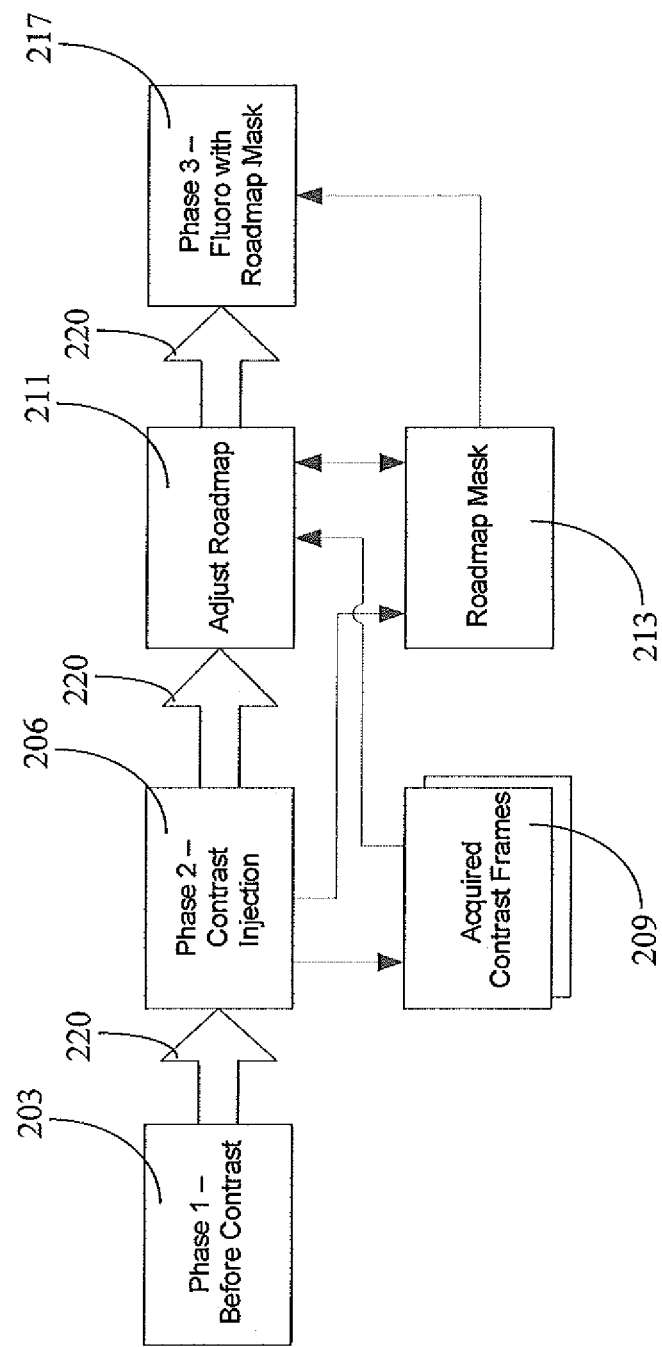
FIG. 2 shows a flowchart of a process for Roadmap mask adjustment by rebuilding a mask from saved contrast images, according to invention principles.

FIG. 2 shows a flowchart of a process for Roadmap mask adjustment by rebuilding a mask from saved contrast images. Arrows 220 represent workflow transitions other arrows represent data flow. System 10 (FIG. 1) adjusts appearance of contrast agent in images for use in an angiographic roadmapping procedure to isolate vasculature of interest. In response to performing a contrast agent injection on a patient in a roadmapping procedure in phase 2 step 206 following a pre-contrast agent administration phase 1 step 203, system 10 derives and stores a sequence of images acquired in step 209 containing cumulative contrast agent.

Figure 5:
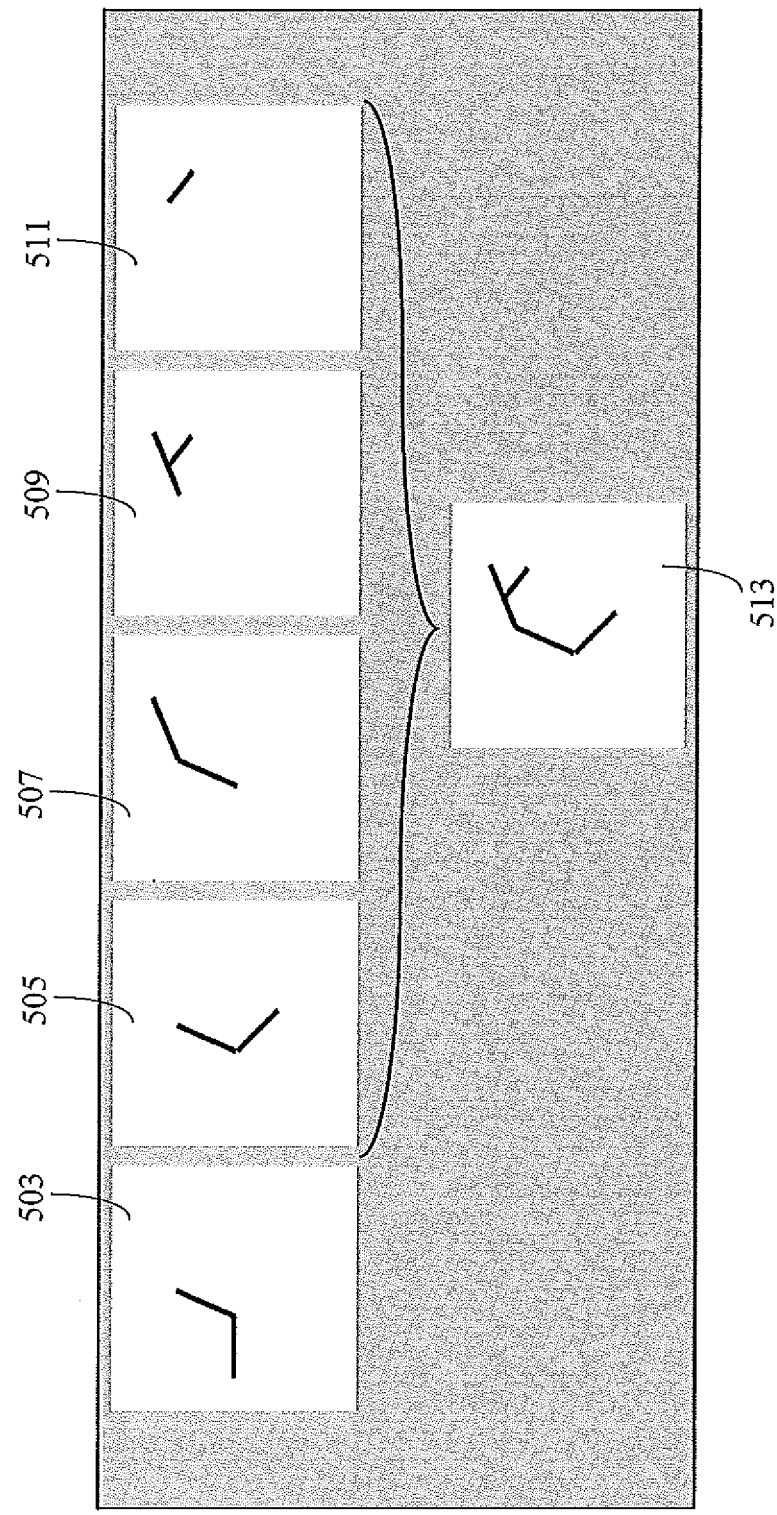
FIG. 5 shows a sequence of stored contrast images and a resulting opacified image generated from user selection of the last four images in the sequence, according to invention principles.

FIG. 5 shows a sequence of stored contrast images and a resulting opacified image 513 generated from user selection of the images 505, 507, 509 and 511 in the sequence in step 211 (FIG. 2). In FIG. 5 the contrast agent is flowing from left to right. In image 503, there is contrast agent present in a vessel that is not of interest for the procedure. The contrast agent flows into more distal vessels that are of interest. Following Phase 2 in step 206, a display image presented on display 19 (FIG. 1) enables a user to select a contiguous set of images in step 211 that are used to construct a maximally opacified roadmap mask image. In this case, a user selects images 505, 507, 509 and 511. These images are combined into a new image 513 wherein each pixel represents the most opacified pixel value at a particular pixel location in each of the component images 505, 507, 509 and 511. Other advantageous methods of establishing the pixel value for the maximally opacified mask image 513 include a weighted average of component image pixels values or an interpolated peak contrast agent value derived from the discrete pixel contrast agent values observed over time, for example. The generation of an opacified mask image in one embodiment further includes spatial filtering of either the component or resultant images.

System 10 in step 211 (FIG. 2) enables a user to select a range of images of vasculature containing contrast agent that are to be included in a roadmap mask image that is used in a later phase of a procedure for subtraction from live fluoroscopy images, for example. Specifically, a user selects a contiguous set of images from the set of images stored in step 209 containing contrast agent and the selected images are used to generate a new roadmap mask image. System 10 in step 213 stores the selected images and resultant derived roadmap mask image. System 10 in step 217 generates a new roadmap image representing a recalculated and updated roadmap by subtracting the roadmap mask image derived in step 211 from a live fluoroscopy image to enhance visualization of an invasive instrument, for example. The roadmap mask contains contrast agent and is subtracted from a live fluoroscopy image leaving an image showing features that are not present in both images, specifically the resultant image shows contrast agent from the mask image, and invasive instrument devices inserted after introduction of contrast agent.

Figure 3:
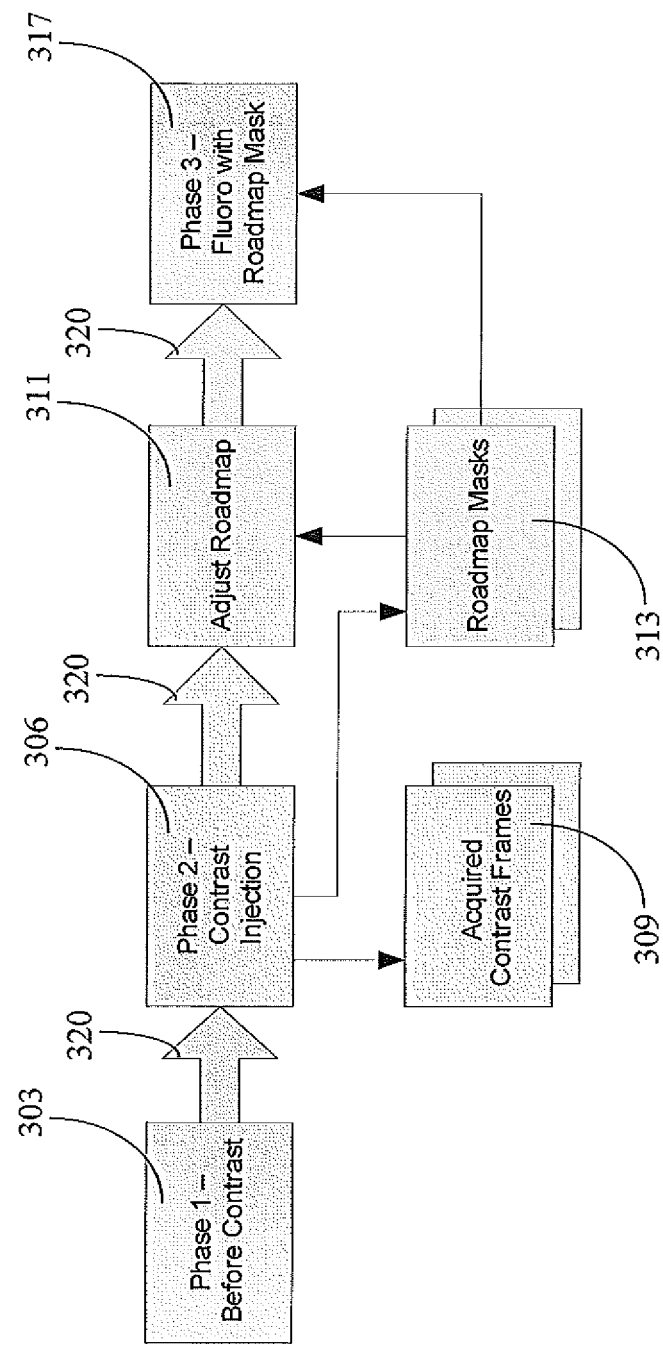
FIG. 3 shows a flowchart of a process for Roadmap mask adjustment by selecting from saved roadmap masks, according to invention principles.

FIG. 3 shows a flowchart of a process for Roadmap mask adjustment by selecting from saved roadmap mask images. Arrows 320 represent workflow transitions other arrows represent data flow. System 10 (FIG. 1) adjusts appearance of contrast agent in images for use in an angiographic roadmapping procedure to isolate vasculature of interest. In response to performing a contrast agent injection on a patient in a roadmapping procedure in phase 2 step 306 following a pre-contrast agent administration phase 1 step 303, system 10 derives and stores a sequence of images in step 309 containing cumulative contrast agent.

Figure 4:
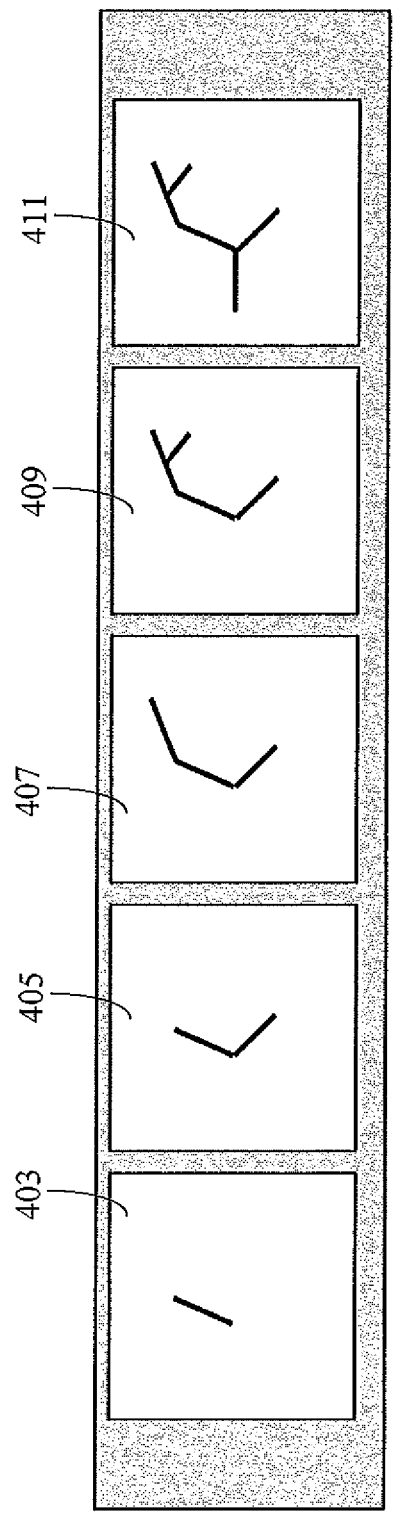
FIG. 4 shows a sequence of accumulated contrast images stored as a set of roadmap masks, according to invention principles.

FIG. 4 shows a sequence of cumulative contrast images stored as a set of roadmap mask images in step 309 (FIG. 3). The sequence of cumulative contrast images comprise maximally opacified (accumulated contrast agent) images, with each image containing the darkest pixels of the current image and preceding images (i.e., acquired before the current image). The contrast agent is flowing from left to right in images 403, 405, 407 and 409, In image 411, there is a reflux of contrast agent filling a vessel that is not of interest for the procedure. Following, Phase 2 in step 306 (FIG. 3), a user is enabled in step 311 to select from a group of maximally opacified images an image which is most relevant to the procedure. In this case, it is image 409, as the contrast reflux is absent from this image. System 10 enables a user in step 311 to select one of these images using an existing interface such as a joystick control (enabling a loop of acquired images to be navigated and reviewed). Alternatively, a navigation image presented on display 19 shows the images 403-411 and prompts a user to select one of these images as a mask image.

System 10 in step 311 (FIG. 3) enables a user to navigate through the sequence of cumulative contrast agent images derived and stored in step 309 to "undo" and remove latter parts of the contrast agent injection by navigating back through the history of contrast agent accumulation to select a desired cumulative contrast agent image as a roadmap mask image. The roadmap mask image is used in a later phase of a procedure for subtraction from live fluoroscopy images, for example. The storage of the incrementally cumulative contrast agent image sequence in step 309 eliminates a need for recalculation of a cumulative contrast agent image. User interface 26 (FIG. 1) provides user friendly interaction and navigation via a joystick, touchscreen or button press, or gesture interface for navigating through the stored cumulative contrast agent roadmap images. In response to roadmap image selection, system 10 in step 317 generates a new roadmap representing a recalculated and updated roadmap image by subtracting the roadmap mask image derived in step 311 from a live fluoroscopy image to enhance visualization of an invasive instrument, for example.

User selection of a set of images used to compose an opacified image involves user selection of both the number of contiguous images being used and their position within a saved image sequence. In one embodiment user interface 26 (FIG. 1) comprises an input device with at least two axes of motion, where one axis is used to select the number of images and the other is used to select a specific set of this number of images (e.g. a joystick, touch pad or other control). As an alternative to a two-axis user interface device, separate user interface control elements may be used to select these elements or a user may be prompted for text entry to select these elements. In one embodiment the roadmap mask is adjusted in the presence of X-ray radiation, when the mask is subtracted from a live X-ray image showing an invasive instrument. This enables a user to see both the instrument as well as the effect of changing the amount of contrast agent used in a roadmap mask image, and enables a user to change the amount of contrast agent once phase 3 (step 317 FIG. 3) of roadmapping has been initiated. This advantageously enables a user to change the amount of contrast agent to be used in a roadmapping mask without repetition of roadmapping image acquisition.

Figure 6:
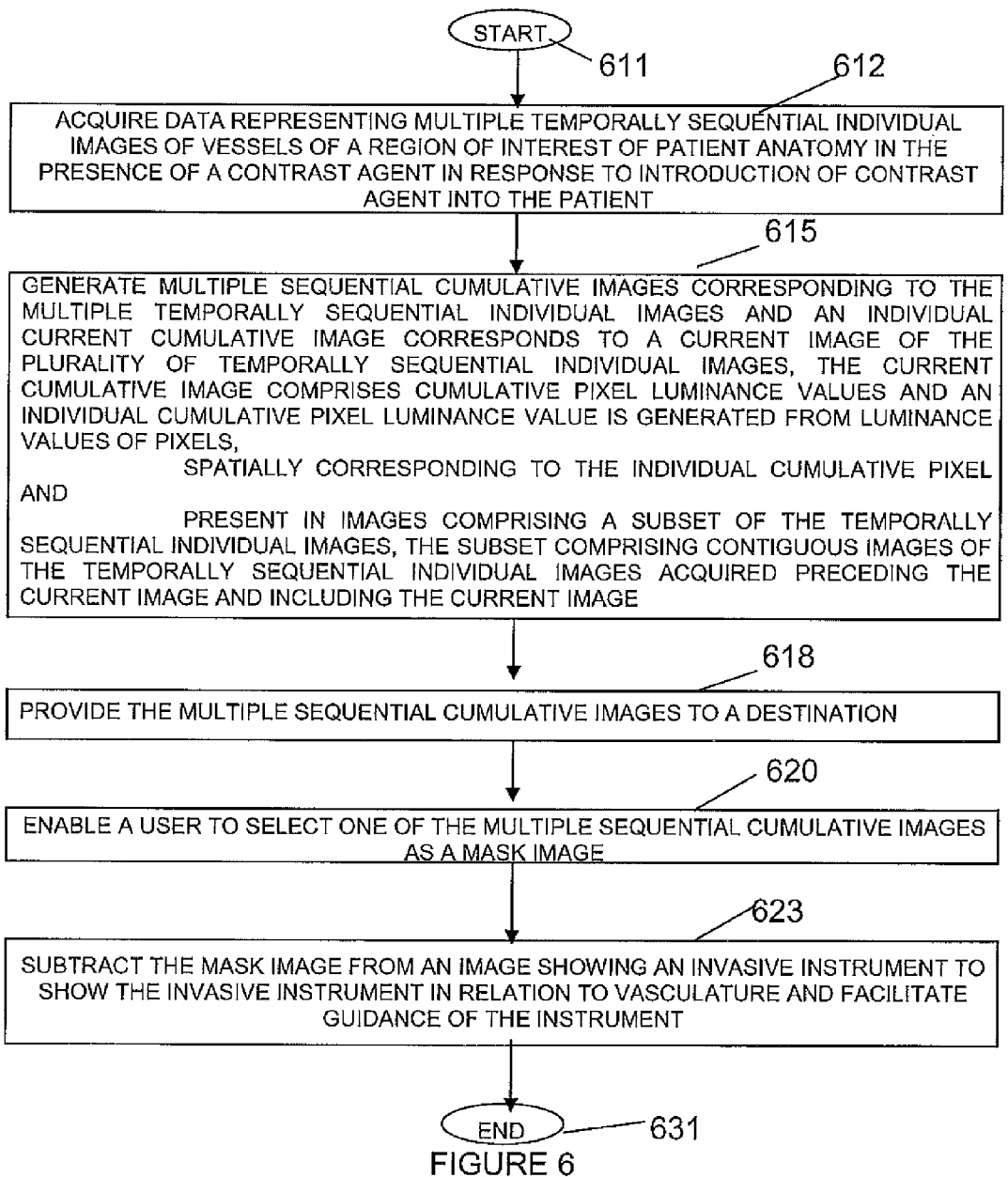
FIG. 6 shows a flowchart of a process used by a system for providing a roadmap image displaying a vessel structure of a region of interest of a patient for use in guiding an invasive instrument during an angiography procedure, according to invention principles.

FIG. 6 shows a flowchart of a process used by system 10 (FIG. 1) for providing a roadmap image displaying a vessel structure of a region of interest of a patient for use in guiding an invasive instrument during an angiography procedure. In step 612, following the start at step 611, imaging system 25 (FIG. 1) acquires data representing multiple temporally sequential individual images of vessels of a region of interest of patient anatomy in the presence of a contrast agent in response to (i.e., following) introduction of contrast agent into the patient. In step 615 image data processor 15 generates multiple sequential cumulative images corresponding to the multiple temporally sequential individual images. An individual current cumulative image corresponds to a current image of the multiple temporally sequential individual images. The current cumulative image comprises cumulative pixel luminance values and an individual cumulative pixel luminance value is generated from luminance values of pixels, spatially corresponding to the individual cumulative pixel and present in images comprising a subset of the temporally sequential individual images. The subset comprises contiguous images of the temporally sequential individual images selected by a user via user interface 26 (or automatically by the system) and acquired preceding the current image and including the current image.

Display 19 presents the multiple temporally sequential individual images and user interface 26 enables a user to select, the number of images in the subset and the portion of the sequence of the multiple temporally sequential individual images as the subset. In one embodiment user interface 26 enables a user to select, a different number of images in the subset and a different portion of the sequence of the multiple temporally sequential individual images as the subset and in response the image data processor generates a different cumulative image comprising the mask image. Image data processor 15 subtracts the different mask image from an image showing an invasive instrument to show the invasive instrument in relation to vasculature and facilitate guidance of the instrument.

Image data processor 15 derives the individual cumulative pixel luminance value by selecting the luminance value of the luminance values of the pixels having the greatest opacity. In another embodiment image data processor 15 derives the individual cumulative pixel luminance value by using a weighted sum of the luminance values of the pixels. In a further embodiment image data processor 15 derives the individual cumulative pixel luminance value by interpolating between the luminance values of the pixels. User interface 26 dynamically displays a cumulative image derived by the image data processor in response user selection of a number of images in the subset and the portion of the sequence of the plurality of temporally sequential individual images as the subset. Output processor 29 in step 618 provides the multiple sequential cumulative images to a destination. User interface 26 in step 620 enables a user to select one of the multiple sequential cumulative images as a mask image. In step 623 image data processor 15 subtracts the mask image from an image showing an invasive instrument to show the invasive instrument in relation to vasculature and facilitate guidance of the instrument. The process of FIG. 6 terminates at step 631.

A processor as used herein is a device for executing machine-readable instructions stored on a computer readable medium, for performing tasks and may comprise any one or combination of hardware and firmware. A processor may also comprise memory storing machine-readable instructions executable for performing tasks. A processor acts upon information by manipulating, analyzing, modifying, converting or transmitting information for use by an executable procedure or an information device, and/or by routing the information to an output device. A processor may use or comprise the capabilities of a computer, controller or microprocessor, for example, and is conditioned using executable instructions to perform special purpose functions not performed by a general purpose computer. A processor may be coupled (electrically and/or as comprising executable components) with any other processor enabling interaction and/or communication therebetween, A user interface processor or generator is a known element comprising electronic circuitry or software or a combination of both for generating display images or portions thereof. A user interface comprises one or more display images enabling user interaction with a processor or other device.

An executable application, as used herein, comprises code or machine readable instructions for conditioning the processor to implement predetermined functions, such as those of an operating system, a context data acquisition system or other information processing system, for example, in response to user command or input. An executable procedure is a segment of code or machine readable instruction, sub-routine, or other distinct section of code or portion of an executable application for performing one or more particular processes. These processes may include receiving input data and/or parameters, performing operations on received input data and/or performing functions in response to received input parameters, and providing resulting output data and/or parameters. A user interface (UI), as used herein, comprises one or more display images, generated by a user interface processor and enabling user interaction with a processor or other device and associated data acquisition and processing functions.

The UI also includes an executable procedure or executable application. The executable procedure or executable application conditions the user interface processor to generate signals representing the UI display images. These signals are supplied to a display device which displays the image for viewing by the user. The executable procedure or executable application further receives signals from user input devices, such as a keyboard, mouse, light pen, touch screen or any other means allowing a user to provide data to a processor. The processor, under control of an executable procedure or executable application, manipulates the UI display images in response to signals received from the input devices. In this way, the user interacts with the display image using the input devices, enabling user interaction with the processor or other device. The functions and process steps herein may be performed automatically or wholly or partially in response to user command. An activity (including a step) performed automatically is performed in response to executable instruction or device operation without user direct initiation of the activity.

The system and processes of FIGS. 1-6 are not exclusive. Other systems and processes may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. A system enables adaptive selection of images used to derive a roadmap mask image as well as adaptive selection of the process used to generate the roadmap mask image from the selected images in adjusting appearance of contrast agent in images by subtraction of the roadmap mask image to isolate features of interest. FIG. 1 shows system 10 for providing a roadmap image displaying a vessel structure of a region of interest of a patient for use in guiding an invasive instrument during an angiography procedure. Further, the processes and applications may, in alternative embodiments, be located on one or more (e.g., distributed) processing devices on a network linking the units of FIG. 1. Any of the functions and steps provided in FIGS. 1-6 may be implemented in hardware, software or a combination of both.

What is claimed is:

1. A system for providing a roadmap image displaying a vessel structure of a region of interest of a patient for use in guiding an invasive instrument during an angiography procedure, comprising:
an imaging system for acquiring data representing a plurality of temporally sequential individual images of vessels of a region of interest of patient anatomy in the presence of a contrast agent;
a user interface enabling a user to select a contiguous subset of said temporally sequential individual images;
an image data processor for generating a cumulative image comprising cumulative pixel luminance values and an individual cumulative pixel luminance value is generated from luminance values of pixels,
spatially corresponding to said individual cumulative pixel and
present in images comprising said subset; and
an output processor for providing the generated cumulative image comprising a mask image to a destination.

2. A system according to claim 1, wherein
a display presents said plurality of temporally sequential individual images,
said user interface enables a user to select,
the number of images in said subset and
the portion of the sequence of said plurality of temporally sequential individual images as said subset and
said image data processor subtracts said mask image from an image showing an invasive instrument to show the invasive instrument in relation to vasculature and facilitate guidance of said instrument.

3. A system according to claim 2, wherein
said user interface enables a user to select,
a different number of images in said subset and
a different portion of the sequence of said plurality of temporally sequential individual images as said subset and in response said image data processor generates a different cumulative image comprising said mask image wherein
said image data processor subtracts the different mask image from an image showing an invasive instrument to show the invasive instrument in relation to vasculature and facilitate guidance of said instrument.

4. A system according to claim 1, wherein
said image data processor derives said individual cumulative pixel luminance value by selecting the luminance value of said luminance values of said pixels having the greatest opacity.

5. A system according to claim 1, wherein
said image data processor derives said individual cumulative pixel luminance value by using a weighted sum of said luminance values of said pixels.

6. A system according to claim 1, wherein
said image data processor derives said individual cumulative pixel luminance value by interpolating between said luminance values of said pixels.

7. A system according to claim 1, wherein
said user interface dynamically displays a cumulative image derived by said image data processor in response user selection of a number of images in said subset and the portion of the sequence of said plurality of temporally sequential individual images as said subset.

8. A system for providing a roadmap image displaying a vessel structure of a region of interest of a patient for use in guiding an invasive instrument during an angiography procedure, comprising:
an imaging system for acquiring data representing a plurality of temporally sequential individual images of vessels of a region of interest of patient anatomy in the presence of a contrast agent;
an image data processor for generating a plurality of sequential cumulative images corresponding to said plurality of temporally sequential individual images and an individual current cumulative image corresponds to a current image of said plurality of temporally sequential individual images, said current cumulative image comprises cumulative pixel luminance values and an individual cumulative pixel luminance value is generated from luminance values of pixels,
spatially corresponding to said individual cumulative pixel and
present in images comprising a subset of said temporally sequential individual images, said subset comprising contiguous images of said temporally sequential individual images acquired preceding said current image and including said current image; and
an output processor for providing said plurality of sequential cumulative images to a destination.

9. A system according to claim 8, including
a user interface enabling a user to select one of said plurality of sequential cumulative images as a mask image wherein
said image data processor subtracts said mask image from an image showing an invasive instrument to show the invasive instrument in relation to vasculature and facilitate guidance of said instrument.

10. A system according to claim 9, wherein
said user interface enables a user to select a different one of said plurality of sequential cumulative images as a mask image wherein
said image data processor subtracts the different mask image from an image showing an invasive instrument to show the invasive instrument in relation to vasculature and facilitate guidance of said instrument.

11. A system according to claim 8, wherein
said image data processor derives said individual cumulative pixel luminance value by selecting the luminance value of said luminance values of said pixels having the greatest opacity.

12. A system according to claim 8, wherein
said image data processor derives said individual cumulative pixel luminance value by using a weighted sum of said luminance values of said pixels.

13. A system according to claim 8, wherein
said image data processor derives said individual cumulative pixel luminance value by interpolating between said luminance values of said pixels.

14. A method for providing a roadmap image displaying a vessel structure of a region of interest of a patient for use in guiding an invasive instrument during an angiography procedure, comprising the activities of:

acquiring data representing a plurality of temporally sequential individual images of vessels of a region of interest of patient anatomy in the presence of a contrast agent in response to introduction of contrast agent into the patient;

generating a plurality of sequential cumulative images corresponding to said plurality of temporally sequential individual images and an individual current cumulative image corresponds to a current image of said plurality of temporally sequential individual images, said current cumulative image comprises cumulative pixel luminance values and an individual cumulative pixel luminance value is generated from luminance values of pixels, spatially corresponding to said individual cumulative pixel and present in images comprising a subset of said temporally sequential individual images, said subset comprising contiguous images of said temporally sequential individual images acquired preceding said current image and including said current image; and providing said plurality of sequential cumulative images to a destination.

15. A system according to claim 14, including the activities of enabling a user to select one of said plurality of sequential cumulative images as a mask image and subtracting said mask image from an image showing an invasive instrument to show the invasive instrument in relation to vasculature and facilitate guidance of said instrument.

* * * * *